United States Patent [19]

Fauteux et al.

[11] Patent Number: 6,030,719
[45] Date of Patent: Feb. 29, 2000

[54] LITHIUM ION ELECTROLYTIC CELL HAVING A CONTROLLED ELECTRODE SURFACE INTERFACE

[75] Inventors: Denis G. Fauteux, Acton; Jie Shi, Arlington, both of Mass.; Kazuko Otani, Kawasaki, Japan; Eitaro Takahashi, Matsudo, Japan; Kenji Okahara, Machida, Japan

[73] Assignee: Mitsubishi Chemical Corporation, Tokyo, Japan

[21] Appl. No.: 09/136,986

[22] Filed: Aug. 20, 1998

Related U.S. Application Data

[63] Continuation-in-part of application No. 08/812,021, Mar. 6, 1997, Pat. No. 5,853,917.

[51] Int. Cl.$^7$ .................................................. H01M 10/44
[52] U.S. Cl. .................. 429/52; 429/231.9; 429/231.95; 429/324; 429/326; 429/331; 429/338
[58] Field of Search ............................ 429/231.9, 231.95, 429/324, 326, 331, 338, 52

[56] References Cited

U.S. PATENT DOCUMENTS

| | | | |
|---|---|---|---|
| 5,529,859 | 6/1996 | Shu et al. ................................ | 429/194 |
| 5,604,056 | 2/1997 | Fauteux et al. ..................... | 429/232.95 |
| 5,626,981 | 5/1997 | Simon et al. ............................. | 429/105 |

FOREIGN PATENT DOCUMENTS

| | | |
|---|---|---|
| 7-220756 | 8/1995 | Japan . |
| 8-273700 | 10/1996 | Japan . |

*Primary Examiner*—Bruce F. Bell
*Attorney, Agent, or Firm*—Factor and Shaftal

[57] ABSTRACT

The present invention is directed to a lithium ion electrolytic cell having a controlled electrode surface interface, and, an associated electrochemical process. The lithium ion electrolytic cell includes an electrode with a carbonaceous surface and a passivating layer, and, an electrolyte having a solvent. The passivating layer includes lithium, carbon and at least one of an additive or the product of interaction of the additive with the carbonaceous surface. The passivating layer has, as measured by X-ray photoelectron spectroscopy, a relative thickness index within the range of about from 10 to about 90, and a lithium ion content index in the range from about 0.1 to about 0.7.

16 Claims, 3 Drawing Sheets

LITHIUM ION ELECTROLYTIC CELL HAVING A CONTROLLED ELECTRODE SURFACE INTERFACE

This is a continuation-in-part application of U.S. application Ser. No. 08/812,021, filed Mar. 6, 1997 now U.S. Pat. No. 5,853,917.

BACKGROUND OF THE INVENTION

1. Field of the Invention

The present invention relates in general to secondary electrolytic cells, and more particularly, to lithium ion electrolytic cells, and associated electrolytic processes, having an additive which substantially precludes gas generation within the cell as a result of decomposition of solvents used in association with the electrolyte, and, wherein the additive itself does not form a gas during its decomposition during cell cycling and storage.

2. Background Art

Lithium ion electrolytic cells (such as lithium ion secondary batteries) have been known in the art for several years. Furthermore, lithium batteries using liquid, gel, polymer or plastic electrolytes which utilize carbon electrodes are likewise well known.

Although such electrolytes have been utilized, problems have been identified with respect to commercial solvents, utilized within the electrolyte, decomposing during cell cycling and storage. Indeed, as such solvents decompose, two adverse reactions occur. Specifically, upon initial charging of the cell, the solvent reacts with the electrode interface and forms a passivating layer thereat. As a result, the first cycle coulombic efficiency of the electrolytic cell is greatly diminished. Secondly, as the electrolytic cell is initially cycled and continues to be cycled, as well as stored, the solvent within the electrolyte continues to decompose—wherein such decomposition results in generation of gas, which creates a pressure buildup inside the cell.

In an attempt to resolve the above-identified problems, the prior art has utilized an additive, typically added to the solvent/electrolyte, which reacts with the surface of the electrode prior to the solvent. As a result, the additive forms a passivating layer which precludes decomposition of the solvent.

While such prior art electrolytic cells have addressed concerns relative to decomposition of the solvent, they nevertheless have been unable to resolve the adverse offset associated with gas generation due to decomposition of the additive itself. Accordingly, while the use of additives have proven somewhat beneficial, gas generation, albeit from the additives as opposed to the solvent, still persists.

SUMMARY OF THE INVENTION

The present invention is directed to a lithium ion electrolytic cell and associated electrochemical process. The actual cell comprises a first electrode and a second electrode, wherein at least one of the first or second electrodes is a carbonaceous electrode having a surface, an electrolyte and a passivating layer. The passivating layer is associated with the surface of the carbonaceous electrode and includes at least carbon, lithium and at least one of an additive or the product of the interaction of the additive with the carbonaceous electrode.

The passivating layer itself has a relative thickness index which ranges from about 10 to about 90, and a relative lithium ion content index which ranges from about 0.1 to about 0.7, as measured by X-ray photoelectron spectroscopy, relative to the carbon and lithium, at a discharged state after at least one electrolytic cell cycling, wherein, the relative thickness index is calculated from the formula: $A[C1s(2)]/A[C1s(1)]$, wherein, $A[C1s(1)]$=the area under the peak of the measured carbon in the 1s orbital, and which peak top is between 284.4 and 284.8 eV, and $A[C1s(2)]$=the total area of all measured peaks for carbon in the 1 s orbital $(-) A[C1s(1)]$; and the relative lithium ion content index is calculated from the formula $A[Li1s]/A[C1s(2)]$, wherein, $A[Li1s]$=the total area of all measured peaks for lithium in the 1 s orbital.

In one preferred embodiment, the additive, or product of the interaction of the additive substantially precludes gas generation which would otherwise occur within the electrolytic cell upon decomposition of constituents within the electrolyte or upon decomposition of the additive or the product of interaction of the additive within the passivating layer.

It is also preferred that the relative thickness index of the passivating layer ranges from about 20 to about 80, while in another preferred embodiment the relative thickness index of the passivating layer ranges from about 30 to about 70. Likewise, in such preferred embodiments, the relative lithium ion content index may be in the range from about 0.15 to about 0.6, or, alternatively, from about 0.2 to about 0.5.

BEST MODE OF THE INVENTION

Figure 1:
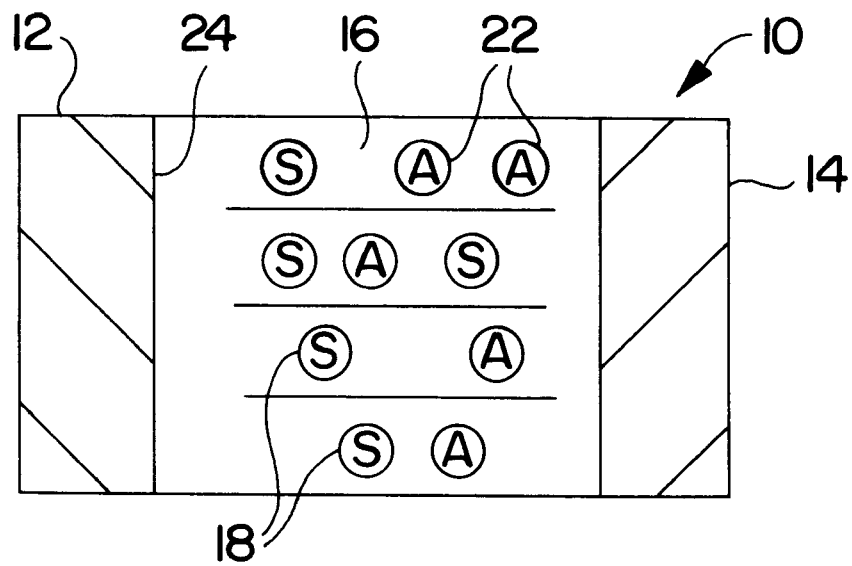
FIG. 1 of the drawings is a schematic representation of the lithium ion electrolytic cell of the present invention prior to an initial charge.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Lithium ion electrolytic cell 10 is shown in FIG. 1, prior to application of an electrical charge, as comprising first electrode 12 (having a carbonaceous surface 24), second electrode 14 and electrolyte 16. Electrolyte 16 includes solvent 18 or mixtures thereof and additive 22. Although additive 22 is shown as being initially associated with the electrolyte, it is also contemplated that the additive initially be associated with either or both of first and second electrodes 12, 14, respectively.

Furthermore, although additive 22 will be exemplified in the experiments, discussed below, as comprising two specific ring opening spiro-ketones, compounds comprising similar functional groups, including ring opening spiro or cyclo organic compounds, among others, which, 1) will react with the carbonaceous electrode prior to the solvents in the electrolyte; 2) form a passivating layer having relative thickness and lithium ion content indexes within the identified ranges and ratios (as will be described) on the carbonaceous surface; 3) which then substantially blocks any potentially gas generating solvents in the electrolyte from contact with the carbonaceous surface; and 4) which will be substantially precluded from generating a gas within lithium ion electrolyte cell 10 upon decomposition during cell cycling and storage, are also contemplated. Additionally, while reference will be made to the additive precluding or otherwise obstructing generation of a gas, it will be readily understood to those with ordinary skill in the art that such terminology is not indicative of absolute preclusion but only of significant gas generation which would alter the benefits of the present disclosed invention.

For purposes of the present disclosure, solvent 18 will be identified as comprising an organic carbonate solvent, such as PC (propylene carbonate), DEC (diethyl carbonate), DMC (dimethyl carbonate), EC (ethylene carbonate), although other commercially available and conventionally used solvents or electrolytic systems (such as liquid, polymer, gel and plastic), as would be readily understood to those having ordinary skill in the art having the present disclosure before them, are likewise contemplated for use.

Figure 2:
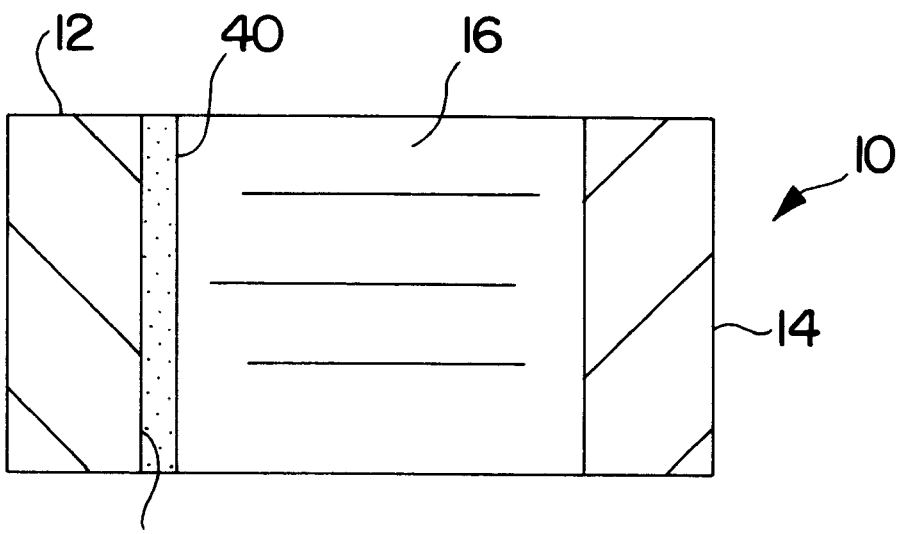
FIG. 2 of the drawings is a schematic representation of the lithium ion electrolytic cell of the present invention after an initial charge.

Lithium ion electrolytic cell 10 is shown in FIG. 2, subsequent to an application of an initial electrical charge, and, in turn, after at least one cell cycling, as including passivating layer 40 on carbonaceous surface 24 of first electrode 12. The passivating layer includes at least lithium, carbon and the additive or the product of interaction of the additive with the carbonaceous surface of first electrode 12. The actual formation of the passivating layer, and interaction of the additive 22 (FIG. 1) with the carbonaceous surface 24, is described in co-pending U.S. patent application Ser. No. 08/812,021, now U.S. Pat. No. 5,853,917, the entirety of which is incorporated herein by reference.

Figure 3:
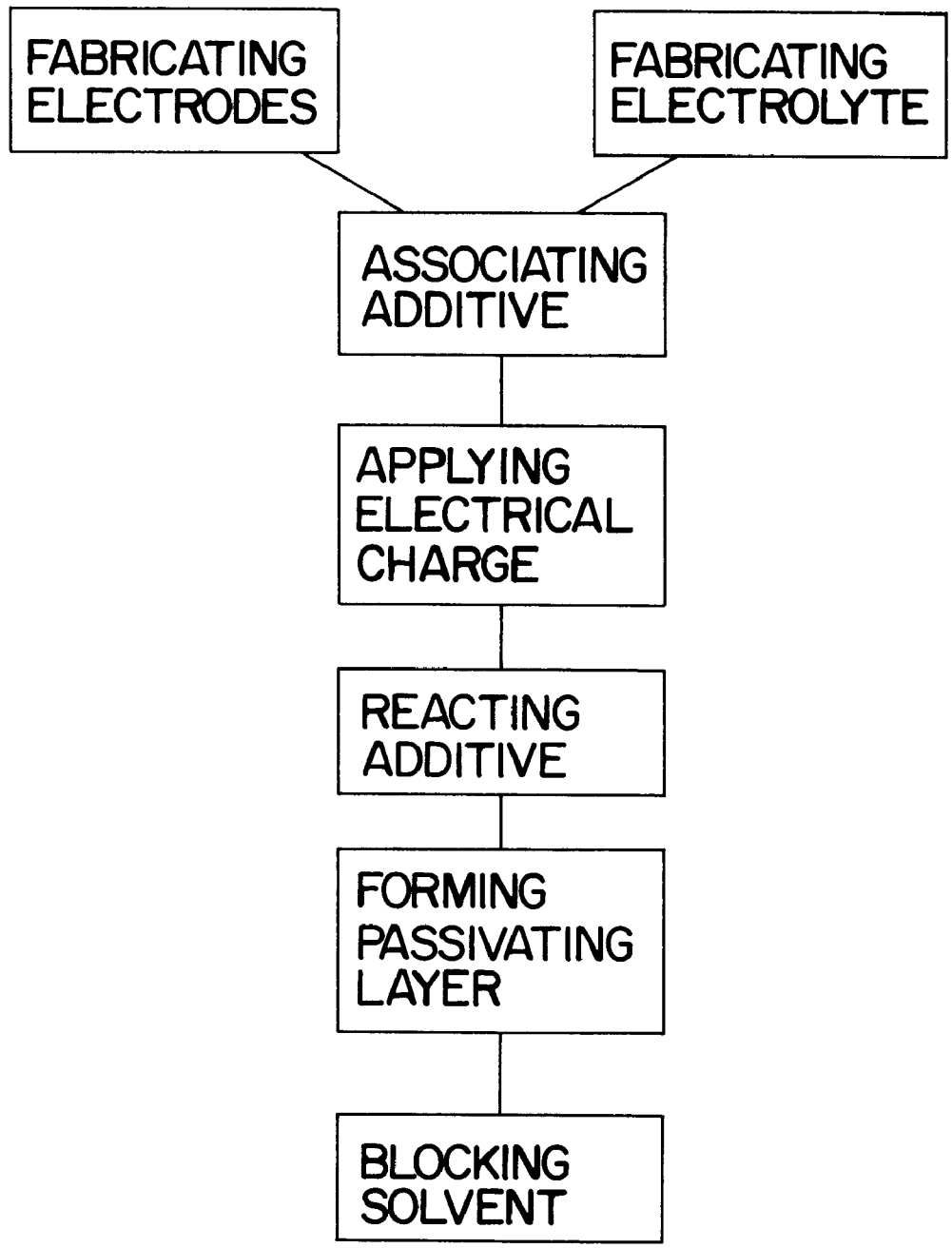
FIG. 3 is a flow chart of the electrochemical process of the present invention.

The process associated with the manufacture of lithium ion electrolytic cell 10 (FIG. 1), as well as the actual electrochemical process which occurs within the cell upon initial electrical charging, is identified in FIG. 3, as including the following steps: First, the initial cell is manufactured by fabricating first electrode 12, second electrode 14 and electrolyte 16. For purposes of the present disclosure, first electrode 12 will comprise an anode having carbonaceous surface 24, and second electrode 14 will comprise a cathode. Of course, in a secondary cell configuration, the anode and cathode will become interchangeable with each other, depending on whether the cell is charging or discharging. The particular electrolyte, as well as the electrodes, will be fabricated using conventional techniques. Additionally, solvent 18 and additive 22 may be initially associated with the electrolyte. However, at least the additive may alternatively, or likewise, be associated with one or both of the electrodes.

After the cell has been fabricated, an initial electrical charge is applied. This charge will result in additive 22 (FIG. 1) reacting with carbonaceous surface 24, so as to form passivating layer 40 (FIG. 2) on the carbonaceous surface of the associated electrode. As a result of such a reaction, the passivating layer will include at least carbon, lithium and at least one of the additive or the product of the interaction of the additive with the carbonaceous surface. Furthermore, the formed passivating layer will have a relative thickness index (as measured by X-ray photoelectron spectroscopy relative to carbon emissions in the 1 s orbital, in the passivating layer) within the range from about 10 to about 90, and a relative lithium ion content index (as measured by X-ray photoelectron spectroscopy relative to lithium emissions in the 1 s orbital, also in the passivating layer) within the range from about 0.1 to about 0.7. Indeed, and as will be exemplified in TABLE 1 (infra) lithium ion electrolytic cells which formulate passivating layers having a thickness to, infra, lithium ion content ratio which fall within the above-identified ranges and ratios exhibit substantially greater first cycle coulombic efficiencies than those lithium ion electrolytic cells which do not utilize an additive (such as the additive claimed and disclosed in co-pending U.S. Pat. No. 5,853,917), and/or which have passivating layers outside of the above-identified range and ratios. For example, it has been observed that passivating layers which utilize an additive of the present invention which have relative thickness index's above 90 and a lithium ion content index of less than 0.1 exhibit poor ionic and electrical conductivity—even though precluding electrolyte decomposition. Conversely, it has likewise been observed that such passivating layers which have relative thickness index's of less than 10 and a lithium ion content index of more than 0.7 exhibit excellent conductivity but are greatly deficient in their ability to preclude electrolyte decomposition.

In support of the increased first cycle coulombic efficiency, and to verify the specific above-identified relative thickness and lithium ion content indexes in the associated formed passivating layers, five experiments were conducted. Each experiment evaluated the carbonaceous electrode of a cycled lithium ion electrolytic cell. In Experiment Nos. 1–3, the carbonaceous material comprised KS6 (a commercially available carbon material from TIMICAL CO. of Switzerland) and 2 wt % PVdF binder. Experiment Nos. 1 and 2 utilized a lithium salt (1M) electrolyte with a 1:1 ratio of PC and EC, while Experiment No. 3 did not utilize EC. Although an additive of the present invention was used in Experiment Nos. 2 and 3, no additive was used in Experiment No. 1—thereby making it a comparative cell, and representative of the prior art.

Additionally, Experiment Nos. 4 and 5 utilized SFG15 as the carbonaceous material (SFG15 is commercially available from TIMICAL CO. of Switzerland), 10 wt % PvdF binder and common lithium salt/PC electrolytes. However, while Experiment No. 4 utilized an additive of the present invention, Experiment No. 5 utilized a prior art additive. Accordingly, Experiment No. 5 was used for comparative purposes. Inasmuch as techniques for determining first cycle coulombic efficiency are well known in the art, and inasmuch as such techniques are described in co-pending U.S. Pat. No. 5,853,917, only the experimental technique for the data uncovered by X-ray photoelectron spectroscopy (also a conventionally known and utilized technique) will be discussed.

In experiments 1–3, the carbonaceous electrode was evaluated by x-ray photoelectron spectroscopy after one cell cycling of the associated lithium ion electrolytic cell. In experiments 4 and 5, the carbonaceous electrode was evaluated after the third cycle. After such cycling, the cells were disassembled and the carbonaceous electrodes were removed. The electrodes were then subjected to a rinse treatment of DME(1,2-dimetoxyethane) for approximately ten minutes. The rinsed electrodes were then dried in a vacuum at 40° C. for approximately one hour.

After the respective electrodes were dried, they were subjected to X-ray photoelectron spectroscopy to determine the intensity of the carbon and lithium in the formed passivating layer. Specifically, the X-ray photoelectron spectroscopy device comprised an ESCA-5500 system commercially available from PHYSICAL ELECTRONICS CO., in Eden Prairie, Minn., U.S.A. The experimental details associated with the use of the device were as follows:

| | |
|---|---|
| X-ray Type: | Al Ka monochromated |
| X-ray kV and mA Emission: | 14 kV, 10.7 mA |
| Electron Take-Off-Angle: | 650 relative to the sample surface |
| Electron Collection Lens | Circle of 0.8 mm diameter yo fill |

-continued

| | |
|---|---|
| Field of View: | in rest |
| Pass Energies Used: | 29.35 eV |
| Step of data points: | 0.125 eV/step |
| Experimentally Observed Resolution: | FWHM of Ag 3d5/2 Ion-etched clean, was 0.75 eV when measured at the above condition |

All operations were carried out in an atmosphere of prepurified nitrogen. Each sample/test electrode was operatively secured between a sample-holder and a Mo-sheet cover. The cover had a 5 mm diameter window.

After the measurements were observed, the following processing details were followed:

| | |
|---|---|
| Baseline Subtraction: | Shirley Method was used Energy range of C1s was 281.5 eV to 296 eV. Energy range of Li1s was 53 eV to 62 eV |
| Data smoothing: | None |
| Energy shifting: | Binding energy scale was corrected By Li1s 57 eV. |

| | |
|---|---|
| Full Width Half Maximum: | 0.75 eV |
| Gaussian/Lorentzian ratio: | 80/20 |
| Peak Top: | 284.6 eV +/− 0.2 eV |
| Peak Hight: | Normalized with intensity of raw spectrum at 284.6 eV |

Accordingly, the above-identified relative thickness index and lithium ion content index of the passivating layers were then calculated as follows:

1. The relative thickness index was calculated from the formula: $A[C1s(2)]/A[C1s(1)]$, wherein, $A[C1s(1)]$=the area under the peak of the measured carbon in the 1 s orbital, and which peak top is between 284.4 and 284.8 eV, and $A[C1s(2)]$=the total area of all measured peaks for carbon in the 1 s orbital $(-) A[C1s(1)]$; and 2. The relative lithium ion content index was calculated from the formula $A[Li1s]/A[C1s(2)]$, wherein, $A[Li1s]$=the total area of all measured peaks for lithium in the 1 s orbital. Based upon the above calculations, as well as the calculations for first cycle coulombic efficiency, the following results were obtained:

TABLE 1

| Experiment No. | Carbonaceous Electrode | Binder | Electrolyte | Additive | $1^{st}$ Cycle Coulombic Efficiency | Relative Thickness Index | Relative Lithium Ion Content Index |
|---|---|---|---|---|---|---|---|
| 1 | KS6 | 2 wt %-PVdF | LiAsF6(1M) – PC + EC(1:1) | None | 36% | 8.2 | 0.51 |
| 2 | KS6 | 2 wt %-PVdF | LiAsF6(1M) – PC + EC(1:1) | 1,4-spiro 5 wt % | 58% | 48.0 | 0.62 |
| 3 | KS6 | 2 wt %-PVdF | LiAsF6(1M) – PC(1:1) | 1,6-spiro 5 wt % | 65% | 11.4 | 0.36 |
| 4 | SFG15 | 10 wt %-PVdF | LiClO4(1M) – PC | 1,6-spiro 8 wt % | 90% | 34.8 | 0.21 |
| 5 | SFG15 | 10 wt %-PVdF | LiClO4(1M) – PC | Vinylene Carbonate 8 wt % | 83% | 108.2 | 0.16 |

Figure 4:
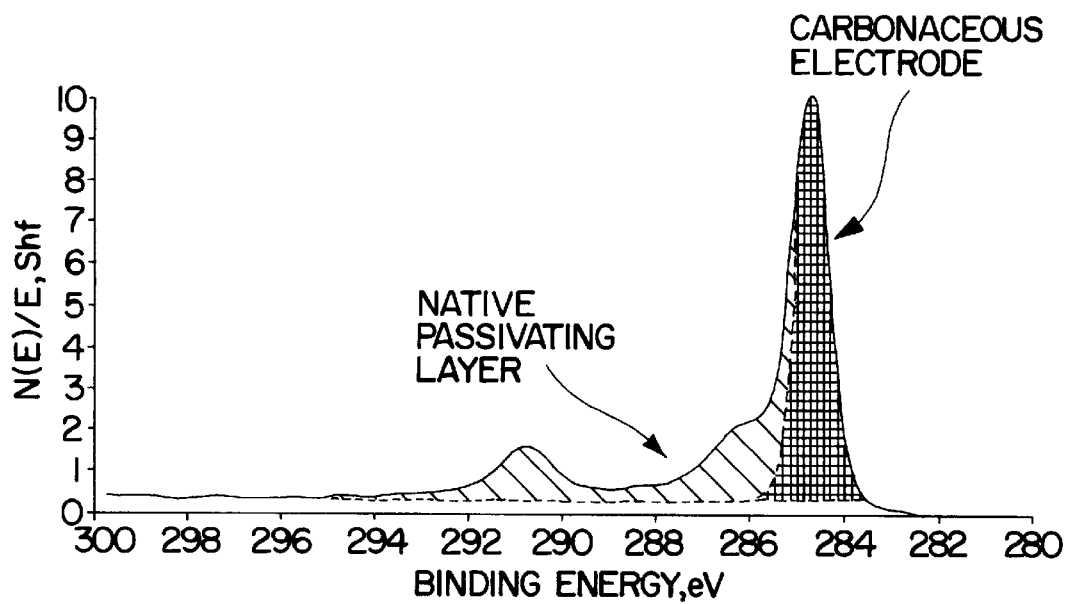
FIG. 4 is an X-ray photoelectron spectroscopic image of a non-cycled carbonaceous electrode.
Figure 5:
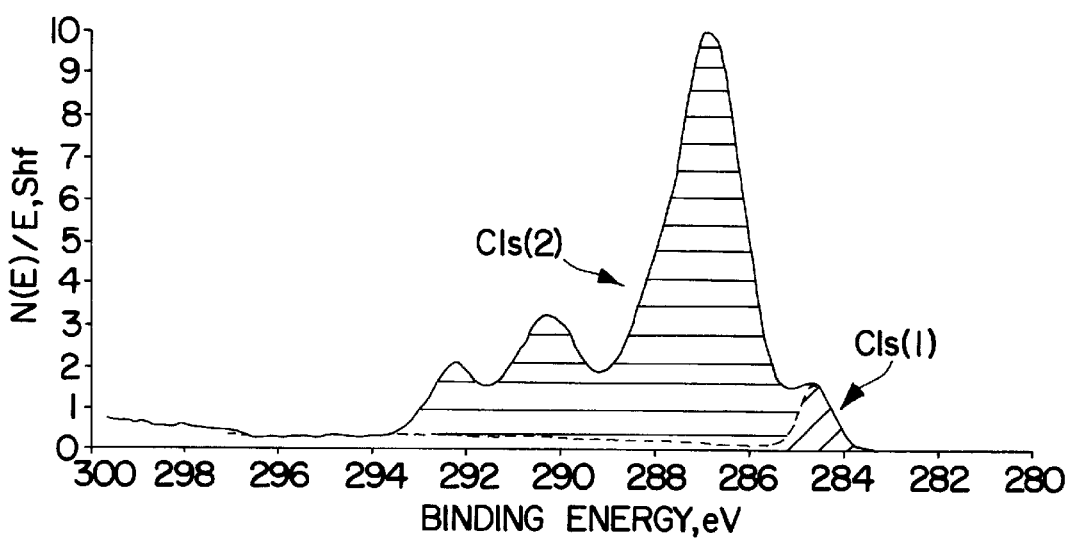
FIG. 5 is an X-ray photoelectron spectroscopic image of a cycled carbonaceous electrode.

After each of the electrodes were measured, the resultant X-ray photoelectron curves were produced relative to carbon and lithium. Additionally, it should be noted that a non-cycled carbonaceous electrode was previously subjected to X-ray photoelectron spectroscopy for purposes of identifying carbonaceous material attributable solely to the carbonaceous electrode, native passivating layer and binder on the non-cycled electrode surface (See, FIG. 4). Indeed, to properly calculate the relative thickness index (based on the carbon) in the formed passivating layer of the cycled cells, the area under the measured peak of the carbonaceous material in the 1 s orbital (as measured in the non-cycled electrode) was required to be subtracted from the total area under the peak for all carbonaceous material in the 1 s orbital for the cycled cells (See, for example, FIG. 5). This "subtracted" peak area of the carbonaceous material was determined to be approximately 284.6 eV, and satisfied the following conditions:

As can be seen from the data in the above table, lithium ion electrolytic cells which utilize an additive in accordance with the present invention, and which had passivating layers with relative thickness and lithium ion content indexes within the above-identified ranges and ratios (Experiment Nos. 2–4), exhibited substantially greater first cycle coulombic efficiencies than like cells which did not incorporate such features.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A lithium ion electrolytic cell comprising:

a first electrode and a second electrode, wherein at least one of the first or second electrodes is a carbonaceous electrode having a surface;

an electrolyte; and a passivating layer, associated with the surface of the carbonaceous electrode, including at least carbon, lithium and at least one of an additive or the product of the interaction of the additive with the carbonaceous electrode, the passivating layer having a relative thickness index from about 10 to about 90, and a relative lithium ion content index from about 0.1 to about 0.7, as measured by X-ray photoelectron spectroscopy, relative to the carbon and lithium, at a discharged state after at least one electrolytic cell cycling, wherein, the relative thickness index is calculated from the formula: $A[C1s(2)]/A[C1s(1)]$, wherein, $A[C1s(1)]$=the area under the peak of the measured carbon in the 1 s orbital, and which peak top is between 284.4 and 284.8 eV, and $A[C1s(2)]$=the total area of all measured peaks for carbon in the 1 s orbital (−) $A[C1s(1)]$; and the relative lithium ion content index is calculated from the formula $A[Li1s]/A[C1s(2)]$, wherein, $A[Li1s]$=the total area of all measured peaks for lithium in the 1s orbital.

2. The lithium ion electrolytic cell according to claim 1 wherein the at least one of the additive or product of the interaction of the additive substantially precludes gas generation which would otherwise occur within the electrolytic cell upon decomposition of constituents within the electrolyte or upon decomposition of the additive or the product of interaction of the additive within the passivating layer.

3. The lithium ion electrolytic cell according to claim 1 wherein the relative thickness index of the passivating layer is from about 20 to about 80.

4. The lithium ion electrolytic cell according to claim 1 wherein the relative thickness index of the passivating layer is from about 30 to about 70.

5. The lithium ion electrolytic cell according to claim 1 wherein the relative lithium ion content index is from about 0.15 to about 0.6.

6. The lithium ion electrolytic cell according to claim 1 wherein the relative lithium ion content index is from about 0.2 to about 0.5.

7. The lithium ion electrolytic cell according to claim 1 wherein the relative thickness index of the passivating layer is from about 20 to about 80 and the relative lithium ion content index is from about 0.15 to about 0.6.

8. The lithium ion electrolytic cell according to claim 1 wherein the relative thickness index of the passivating layer is from about 30 to about 70 and the relative lithium ion content index is from about 0.2 to about 0.5.

9. An electrochemical process within a lithium ion electrolytic cell having a first electrode and a second electrode, wherein at least one of the first or second electrodes is a carbonaceous electrode having a surface, an electrolyte including at least one constituent, and an additive associated with at least one of the electrolyte and the electrode with the carbonaceous electrode, the electrochemical process comprising the steps of:

applying an electrical charge to the lithium ion electrolytic cell; and forming a passivating layer at the surface of the carbonaceous electrode as the result of chemical interaction between the carbonaceous surface and the additive, wherein the passivating layer includes at least carbon, lithium and at least one of the additive or the product of the interaction of the additive with the carbonaceous electrode and wherein the formed passivating layer has a relative thickness index from about 10 to about 90, and a relative lithium ion content index from about 0.1 to about 0.7, as measured by X-ray photoelectron spectroscopy, relative to the carbon and lithium, at a discharged state after at least one electrolytic cell cycling, wherein, the relative thickness index is calculated from the formula: $A[C1s(2)]/A[C1s(1)]$, wherein, $A[C1s(1)]$=the area under the peak of the measured carbon in the 1 s orbital, and which peak top is between 284.4 and 284.8 eV, and $A[C1s(2)]$=the total area of all measured peaks for carbon in the 1 s orbital (−) $A[C1s(1)]$; and the relative lithium ion content index is calculated from the formula $A[Li1s]/A[C1s(2)]$, wherein, $A[Li1s]$=the total area of all measured peaks for lithium in the 1 s orbital.

10. The electrochemical process according to claim 9 further comprising the steps of:

substantially blocking penetration of the at least one constituent in the electrolyte through the passivating layer, and, in turn, into contact with the carbonaceous electrode surface so as substantially preclude gas generation which would otherwise occur within the electrolytic cell upon decomposition of constituents within the electrolyte; and decomposing at least one of the additive or the product of interaction of the additive within the passivating layer during cell cycling and storing without any substantial generation of gas upon such decomposing.

11. The electrochemical process according to claim 9 wherein the relative thickness index of the passivating layer is from about 20 to about 80.

12. The electrochemical process according to claim 9 wherein the relative thickness index of the passivating layer is from about 30 to about 70.

13. The electrochemical process according to claim 9 wherein the relative lithium ion content index is from about 0.15 to about 0.6.

14. The electrochemical process according to claim 9 wherein the relative lithium ion content index is from about 0.2 to about 0.5.

15. The electrochemical process according to claim 9 wherein the relative thickness index of the passivating layer is from about 20 to about 80 and the relative lithium ion content index is from about 0.15 to about 0.6.

16. The electrochemical process according to claim 9 wherein the relative thickness index of the passivating layer is from about 30 to about 70 and the relative lithium ion content index is from about 0.2 to about 0.5.

* * * * *